R. DIXON.
VALVE TESTING DEVICE.
APPLICATION FILED JUNE 21, 1918.
1,289,699.
Patented Dec. 31, 1918.
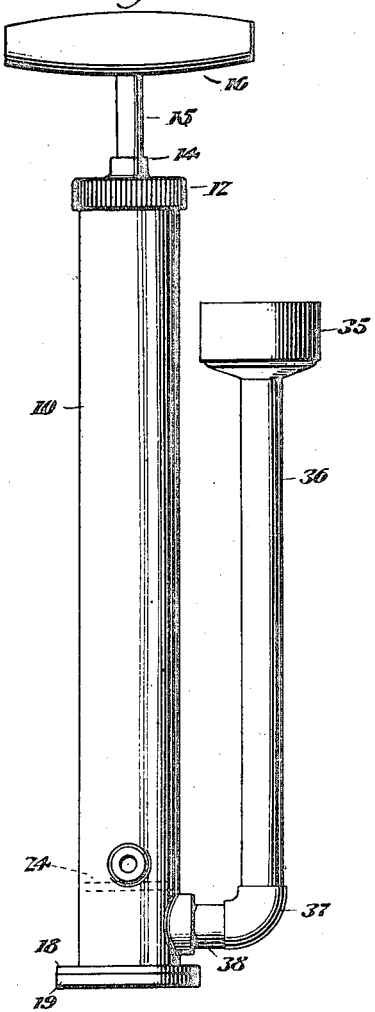
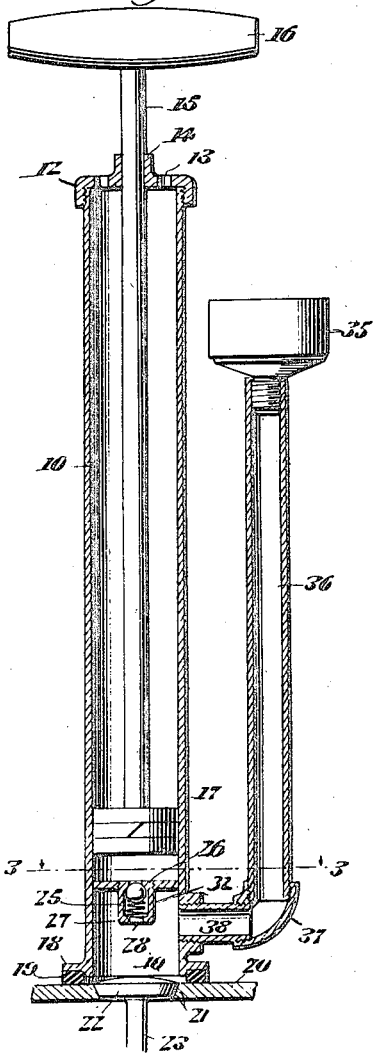
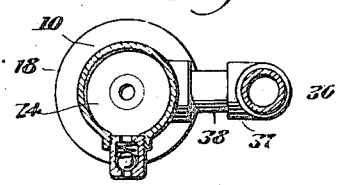
Witnesses
Inventor
Robert Dixon
By Victor J. Evans
Attorney

UNITED STATES PATENT OFFICE.

ROBERT DIXON, OF ARMELLS, MONTANA.

VALVE-TESTING DEVICE.

1,289,699.	Specification of Letters Patent.	Patented Dec. 31, 1918.

Application filed June 21, 1918. Serial No. 241,224.

*To all whom it may concern:*

Be it known that I, ROBERT DIXON, a citizen of the United States, residing at Armells, in the county of Fergus and State of Montana, have invented new and useful Improvements in Valve-Testing Devices, of which the following is a specification.

This invention relates to a valve testing device, and the object is to provide means for testing the accuracy of the fit of the valves of an internal combustion engine.

A further object is to provide, in such a device, means for forcing air into a chamber at the lower portion of a pump cylinder, this chamber inclosing the valve to be tested and being provided with an outlet communicating with a pressure gage, whereby the operator may ascertain whether the valve is properly seated and whether it fits tightly, by observing the pressure gage and ascertaining whether the pressure falls to an appreciable extent, or to an undue extent, after the air has been placed under pressure in the chamber at the lower portion of the pump cylinder.

With the foregoing and other objects in view, the invention consists in the novel construction, combination and arrangement of elements hereinafter described and claimed.

In the accompanying drawings forming a part of this application;

Figure 1 is a view in side elevation.

Fig. 2 is a view in vertical section.

Fig. 3 is a view in transverse section on the line 3—3 of Fig. 2.

In carrying out my invention, I employ a pump cylinder designated 10, and provided with a threaded and flanged cap 12 having an air inlet 13 and a central aperture 14 through which the piston rod 15 passes. This piston rod is provided with the usual handle 16, the piston proper being designated 17.

The lower end of the cylinder 10 is provided with a laterally extending flange 18, a gasket 19 being located as shown and adapted to contact with the wall 20 in which the valve seat 21 is provided.

An engine valve is designated 22, a portion of the stem being shown at 23. At a suitable distance above the lower end of cylinder 10 is web portion or transverse wall 24 having threaded thereinto a sleeve 25, one end of which constitutes a valve seat 26. The other end of the sleeve is flanged as shown at 27 and is provided with a port 28. A ball valve 30 coöperates with the valve seat 26 and is normally held in position to close the port in the wall 24, or in the end of the sleeve, by means of a coiled spring 32. A pressure gage is shown conventionally at 35 and is connected by means of a duct 36, an elbow 37 and pipe section 38, with the lower end of the cylinder 10, below the wall or web 24. An air chamber 40 is therefore provided in the lower end of the pump cylinder and receives air under pressure produced by means of the pump proper, the gage indicating the degree of pressure in chamber 40 and therefore indicating whether or not the valve 22 is properly seated and prevents the escape of air from chamber 40.

What is claimed is:

1. In a device of the class described, a pump cylinder, means for providing an independent chamber therein, said chamber being closed when the cylinder is placed in position over an engine valve, and means for ascertaining the degree of air pressure in the chamber, such pressure being produced by the operation of the pump.

2. In a device of the class described, a pump cylinder, a web portion extending transversely of the cylinder at a point above one end thereof, said web portion being provided with a port, a valve closing the port, a piston operating within the main portion of the cylinder, a pressure gage, and means for connecting the gage with a chamber formed between the web portion and the extreme end of the cylinder.

3. In a valve testing device, a cylinder having an air inlet at one end thereof, a piston operating in the cylinder, a web portion extending transversely of the cylinder near one end thereof, a sleeve connected with said web portion and providing a port connecting the main portion of the cylinder with a chamber formed between the web portion and the adjacent end of the cylinder, a spring held valve having a seat in said sleeve, an outlet at one side of the chamber, a pressure gage connected with said outlet, and means for effecting air tight connection between the end of the cylinder and the jacket of an engine adjacent to the seat of one of the valves thereof.

In testimony whereof I affix my signature.

ROBERT DIXON.